Patented Oct. 30, 1945

2,387,784

UNITED STATES PATENT OFFICE 2,387,784

POLYMERIZATION PROCESS FOR NORMAL OLEFINS

Robert M. Thomas, Union, N. J., and Harold C. Reynolds, Jr., Belmont, Mass., assignors to Standard Oil Development Company, a corporation of Delaware No Drawing. Application December 28, 1940, Serial No. 372,194

9 Claims. (Cl. 260—94)

This invention relates to polymerization process; relates particularly to the polymerization of normal, or linear, olefins; and relates especially to the polymerization of normal, linear olefins by the application thereto at low temperatures of a new catalyst and polymerization procedure.

The olefins generally are known to be reactive for various polymerization reactions, by which materials of increased molecular weights are obtained. The isoolefins polymerize into materials of very high molecular weight, particularly isobutylene, which is readily polymerized by a low temperature technique using a Friedel-Crafts type catalyst, into polymeric substances having molecular weights ranging from 1,000 to 500,000 or even higher. The normal or linear olefins are, however, much more resistant to polymerization, and to the present, the only polymers of such substances as propylene, the normal butylenes, the normal amylenes and the like have been dimer and trimer, although, experimentally, it has been found possible to produce polymers containing from 5 to 7 or 8 molecules of the original olefin, with molecular weights from 300 to 500. These normal olefins are, however, so resistant to polymerization that it has been, to the present, impossible to polymerize them into polymers having molecular weights as high as 1,000. The high resistance to polymerization of the normal olefins is well shown by the fact that they are habitually utilized as inert diluent-refrigerants in the polymerization reaction as applied to isobutylene, and they neither participate in the polymerization reaction nor show any perceptible poisoning effect upon the polymerization of isobutylene, showing that the polymerization conditions for the linear olefins must be wholly different from the polymerization condition of the isoolefins, if high molecular weight polymers are to be obtained.

This characteristic of the various olefins appears to be dependent in part upon the fact that the catalysts previously available have been of relatively low catalyzing power. The unique characteristic of boron trifluoride has been the maintenance of its catalyzing power to very low temperatures, by virtue of its gaseous character. Nevertheless, in low concentrations it is of low catalyzing power in effecting the polymerization of difficultly polymerizable olefins. Most of the other catalysts are useless at low temperatures either because they solidify into an inert solid mass, or are insoluble in the reactants at any temperature.

The present invention thus produces a new type of polymer by the application, to the linear olefins, of a new catalyst under new catalyzing conditions.

Specifically, this catalyst is a strong solution of aluminum chloride or other Friedel-Crafts type catalyst, that is, a metal or metalloid halide, in high concentration solution in a low freezing solvent. This high concentration catalyst solution is then used in relatively very large proportion with the normal olefin cooled to low temperatures and results in a very powerful catalyzing effect, which causes the production of high molecular weight polymers at low temperatures from substances which otherwise polymerize only with the greatest difficulty, and do not polymerize to high molecular weight polymers at all with ordinary catalysts.

Thus an object of the invention is to polymerize the normal olefins to high molecular weight polymers above 1,000 by the application thereto at a low temperature of a relatively large proportion, greater than 25 per cent of the olefin to be polymerized, of a solution of Friedel-Crafts type or active halide catalyst substance in a low freezing solvent in a proportion greater than 2%, the polymerization temperature being below −10° C.

In practicing the invention a substantially saturated solution of the Friedel-Crafts type catalyst such as aluminum chloride, aluminum bromide, aluminum iodide, titanium chloride, uranium chloride, boron trifluoride, zirconium tetrachloride, and the like, is dissolved in a low freezing solvent such as methyl or ethyl chloride, carbon disulfide, propyl chloride in its various forms, chloroform, ethylene dichloride, vinyl chloride, and the like, in a concentration greater than approximately 2%, up to saturation, the solution being prepared at temperatures ranging from those well below the boiling point of the solvent to room temperature or above, depending upon the solvent and the solubility of the particular Friedel-Crafts type substance. (If propyl chloride is used, it must be handled with care as it decomposes rapidly at room temperature when treated with AlCl₃. It must be employed with cooling to, say, 0° C. during the preparation and storage of catalyst solution.) Simultaneously, the olefin to be polymerized is cooled to a temperature ranging from +10° C. to −100° C. or lower, preferably to −50° C. or lower, and is treated with the polymerization catalyst, the amount of catalyst utilized being from about 25 parts of the strong solution per 100 parts of olefin, to about 150 parts of catalyst solution per 100 parts of olefin; the preferred proportion being about equal parts of catalyst solution to olefin. The olefin used may be any of the normal olefins including propylene, butene-1, butene-2, the various amylenes, both normal and the polymerization resistant iso amylenes, the various hexylenes, various of the diolefins, and various of the substituted olefins such as methallyl chloride, the nitro-olefins, the alkyl benzenes which contain unsaturated linkages in the side chains, unsaturated naphthene hydrocarbons and the like. The olefin may be cooled by the use of a diluent-refrigerant such as liquid ethane or liquid methane or liquid propane or liquid butane or solid carbon dioxide may be used, or other of the various known low boiling substances which are inert under the conditions employed for reaction. If solid carbon dioxide is used, it is desirably present in excess sufficient to keep the entire reaction liquid cooled to its normal volatilization temperature of approximately −78° C. In the event that the various liquid diluent refrigerants are used, the preferred range is from 50 parts of diluent-refrigerant per 100 parts of olefin to 500 parts of diluent-refrigerant per 100 parts of olefin depending upon the temperature desired and the olefin being polymerized, since there must be sufficient diluent-refrigerant present to absorb at least a major portion of the heat of polymerization of the olefinic substance.

This reaction and catalyst composition is presented as a general one applicable with all of the acid acting Friedel-Crafts type catalyst substances in combination with solvents which are liquid at temperatures at least as low as −10° C.; which will hold at least 1% of their weight of the Friedel-Crafts type catalyst in solution at that temperature, and which do not form an insoluble or readily solidifiable complex with the Friedel-Crafts type substance. These solvents appear to have a temperature-percentage solubility characteristic which is relatively low, or they readily form supersaturated solutions, or form colloidal solutions of the catalyst solid upon cooling, since when they are prepared at temperatures ranging from the boiling point of the solvent to room temperature or above, as saturated solutions, a major portion up to substantially all of the dissolved solid is held in the solution for substantial periods of time at temperatures ranging from about −10° C. to −100° C. or lower. The exact character of these solutions is not known. They may be true solutions having low temperature characteristics; they may be supersaturated solutions, or they may be colloidal dispersions at the low temperatures. In any case we do not wish to be bound by any theory or hypothesis as to the exact nature of these mixtures but only set forth these possibilities as possible explanations of their chemical nature.

*Example 1*

A catalyst solution was prepared by dissolving 4 parts of aluminum chloride in 100 parts of ethyl chloride at a temperature of 12° C., the solution being readily accomplished by shaking the solid and liquid together. Equal parts of this solution and liquid propylene were mixed in a flask in the presence of solid carbon dioxide at a temperature of −78° C. After an interval of about five minutes, the polymerization reaction set in. This reaction was allowed to continue for an interval of approximately thirty minutes, at the end of which time the reaction was quenched by the addition of an excess of isopropyl alcohol. Approximately 65% of the propylene was found to have polymerized into a solid plastic polymer having a relatively high molecular weight of approximately 2,000 to 4,000.

The effect of the concentration of catalyst in the solution is very marked. A solution of 0.4 part of aluminum chloride was prepared in 100 parts of ethyl chloride and equal parts of this solution and liquid propylene were mixed in the presence of solid carbon dioxide. Even after prolonged standing, no reaction occurred, indicating that the catalyst concentration is critical for this polymerization reaction, and that the critical value lies somewhere between 0.4 part of aluminum chloride per 100 of solvent and 4 parts of aluminum chloride per 100 parts of solvent. The exact point at which the critical value occurs has not as yet been determined, and it is believed to vary with the polymerization temperature, the proportion of olefin to catalyst solution and the character of the olefin.

This reaction as demonstrated in Example 1 appears to be unique to this particular character of catalyst. Propylene is wholly non-reactive in the presence of conventional catalytic amounts of boron trifluoride at temperatures lower than those at which propylene boils and it is inert to the extent that it can be used as a diluent or even as a diluent-refrigerant in the standard procedure for the polymerization of isobutylene. Thus a mixture of liquid isobutylene, with liquid propylene as a diluent, may be prepared and polymerized with gaseous boron fluoride at the temperature of about −50° C. set by the boiling point of the liquid propylene. The isobutylene polymerizes normally to yield a high molecular weight polymer and neither the reaction nor the polymer are influenced in any way by the presence of the liquid propylene, showing that as far as gaseous boron trifluoride is concerned, the propylene is non-reactive.

*Example 2*

A polymerization reaction was conducted exactly as in Example 1, except that the four parts of aluminum chloride were dissolved in 100 parts of ethyl chloride at a temperature of −23° C. The reaction proceeded in the same way as in Example 1; and substantially the same product of polypropylene was obtained.

*Example 3*

A catalyst solution of four parts of aluminum chloride in 100 parts of ethyl chloride was prepared as in Example 1, and equal parts of this solution were added to equal parts of liquefied normal butylene at a temperature of −78° C. as set by the presence of an excess of solid carbon dioxide. A polymerization reaction occurred with the normal butylene to yield a similar polymer of slightly lower molecular weight and lower viscosity.

*Example 4*

A catalyst solution consisting of 6 parts of aluminum chloride in 100 parts of ethyl chloride was prepared at 12° C. and cooled quickly to −103° C. in liquid ethylene. Simultaneously, a mixture of 5 parts of amylene (1-methyl-2-ethyl ethylene) was prepared with 10 parts of liquid ethylene, and the two mixed. The polymerization began within a very few minutes, and in the course of thirty-five minutes, nearly all of the methyl ethyl ethylene polymerized into a solid polymer. The reaction was then quenched as before with isopropyl alcohol and a solid polymer having a weight equal to 77% of the amylene used was recovered. This polymer was found to have a molecular weight of 2600 and a bromine number of 6. This polymer in common with other low temperature polymers was found to be a plastic, elastic substance of somewhat rubbery character, comparable in many ways to polyisobutylene as prepared by low temperature polymerization technique, although definitely of more resinous nature.

It may be noted that the catalyst used in this instance contained approximately 6% of aluminum chloride in solution, and that a major portion of this amount of aluminum chloride was retained in the solution, even when cooled to $-103°$ C. by liquid ethylene.

Example 5

A catalyst solution was prepared by dissolving 3 parts of aluminum chloride with 100 parts of ethyl chloride at 12° C. Simultaneously, a mixture of an isoamylene (3 methyl butene-1) consisting of 15 parts of isoamylene with 30 parts of ethyl chloride was cooled to $-78°$ C., and 100 parts of the ethyl chloride solution of aluminum chloride was added. A vigorous polymerization reaction occurred yielding 9 parts of a solid polymer having a molecular weight of 6500 and a bromine number of 3. This polymer also is a plastic, elastic, rubber-like substance as in Example 3.

Example 6

A catalyst solution consisting of 3 parts of aluminum chloride dissolved in 100 parts of ethyl chloride at 12° C. was prepared as in Example 4, and cooled with solid carbon dioxide to $-78°$ C. Simultaneously, a mixture of 15 parts of amylene and 30 parts of ethyl chloride was prepared and cooled to $-78°$ C. 30 parts of the cooled catalyst solution was then added to the amylene-ethyl chloride mixture, all at $-78°$ C. A very rapid polymerization reaction occurred by which substantially all of the amylene was polymerized to form a solid, plastic, elastic polymer having a molecular weight of approximately 6500 and a bromine number of 3.

Example 7

A similar catalyst solution was mixed in equal parts with a hexylene at a temperature of $-78°$ C., and the hexylene also was found to polymerize slowly into a heavy oily polymer very much like the polymer of amylene described in Example 5.

Example 8

A concentrated solution of $BF_3$ (a saturated solution) in methyl chloride was prepared by passing $BF_3$ through methyl chloride at $-78°$ C. at atmospheric pressure for approximately fifteen minutes. This cold solution was then employed as a catalyst for polymerizing propylene at $-78°$ C. in accordance with the procedure outlined in Example 1. A solid plastic polymer of propylene was obtained which had a molecular weight estimated by bromine number to be in the range of 2,000 to 4,000.

The resulting polymers can be chlorinated by the application of chlorine to the polymer while dissolved in a solvent such as carbon tetrachloride, and the reaction proceeds in a manner closely similar to that with polyisobutylene. Similarly, the polymers are reactive with sulfur monochloride at elevated temperatures. The polymers either per se, or when chlorinated or combined with sulfur monochloride, are readily soluble in hydrocarbon liquids generally, and in such solutions have many valuable properties such as the capability of increasing the viscosity of gasoline boiling range hydrocarbons, increasing the viscosity and viscosity index of lubricants when present in proportions ranging from 0.5% to 10%. Similarly, the polymers either per se, or chlorinated or sulfur chloride treated, are valuable addition agents for paints, varnishes, and lacquers as flexibilizers, tougheners and diluents.

Thus the invention herein above disclosed consists in the polymerization of the more resistant olefins by the application thereto at low temperature of a catalyst solution having a concentration above the critical value below which polymerization does not occur; for the production of polymers previously unknown and impossible of production; which polymers are of relatively high molecular weight, ranging from about 1,000 up to several thousand in magnitude and are useful in the arts as described above.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

The invention claimed is:

1. The process of polymerizing normal olefins having 3 to 6 carbon atoms inclusive comprising the steps of dissolving a Friedel-Crafts type catalyst in an alkyl halide having less than four carbon atoms to a concentration of approximately from 1% to saturation, cooling a polymerization resistant normal olefin having 3 to 6 carbon atoms, inclusive to a temperature below $-10°$ C., mixing about 1 part of the cooled catalyst solution with 0.05 part to 4 parts of the cooled olefin, and allowing the polymerization reaction to continue for a substantial length of time.

2. The process of polymerizing propylene comprising the steps of dissolving a Friedel-Crafts type catalyst in an alkyl halide having less than 4 carbon atoms per molecule to a concentration of approximately 1%, to saturation, cooling propylene to a temperature also below $-10°$ C. and mixing about 1 part of the cooled catalyst solution with about 1 part to 4 parts of the cooled propylene, and allowing the polymerization reaction to continue for a substantial length of time.

3. The process of polymerizing normal olefins having 3 to 6 carbon atoms, inclusive comprising the steps of dissolving aluminum chloride in an alkyl halide having less than four carbon atoms to a concentration of approximately 1%, to saturation, cooling a polymerization resistant normal olefin having three to six carbon atoms, inclusive to a temperature below $-50°$ C., mixing about 1 part of the cooled catalyst solution with about 1 part to 4 parts of the cooled olefin, and allowing the polymerization reaction to continue for a substantial length of time.

4. The process of polymerizing normal olefins having 3 to 6 carbon atoms, inclusive comprising the steps of dissolving a Friedel-Crafts type catalyst in an alkyl halide having less than four carbon atoms to a concentration of approximately 1%, to saturation, cooling a polymerization resistant normal olefin having 3 to 6 carbon atoms, inclusive to a temperature below $-10°$ C., mixing about 1 part of the cooled catalyst solution with about 1 part to 4 parts of the cooled olefin, allowing the polymerization reaction to continue for a substantial length of time, and quenching the polymerization reaction by the addition of an oxygenated liquid.

5. The process of polymerizing normal olefins having 3 to 6 carbon atoms, inclusive comprising the steps of dissolving aluminum chloride in methyl chloride to a concentration of approximately 1%, to saturation, cooling a polymerization resistant normal olefin having 3 to 6 carbon atoms, inclusive to a temperature below —50° C., mixing about 1 part of the cooled catalyst solution with about 1 part to 4 parts of the cooled olefin, and allowing the polymerization reaction to continue for a substantial length of time.

6. The process of polymerizing normal butylene comprising the steps of dissolving a Friedel-Crafts type catalyst in an alkyl halide having less than 4 carbon atoms per molecule to a concentration of approximately 1%, to saturation, cooling normal butylene to a temperature also below —10° C. and mixing about 1 part of the cooled catalyst solution with about 1 part to 4 parts of the cooled normal butylene, and allowing the polymerization reaction to continue for a substantial length of time.

7. The process of polymerizing normal butylene comprising the steps of dissolving a Friedel-Crafts type catalyst in an alkyl halide having less than 4 carbon atoms per molecule to a concentration of approximately 1%, to saturation, cooling normal butylene to a temperature also below —10° C. and mixing about 1 part of the cooled catalyst solution with about 1 part to 4 parts of the cooled normal butylene, and allowing the polymerization reaction to continue for a substantial length of time, and thereafter quenching the polymerization reaction by the addition of an oxygenated liquid.

8. The process of polymerizing amylene comprising the steps of dissolving a Friedel-Crafts type catalyst in an alkyl halide having less than 4 carbon atoms per molecule to a concentration of approximately 1%, to saturation, cooling amylene to a temperature also below 10° C. and mixing about 1 part of the cooled catalyst solution with about 1 part to 4 parts of the cooled amylene, and allowing the polymerization reaction to continue for a substantial length of time.

9. The process of polymerizing amylene comprising the steps of dissolving a Friedel-Crafts type catalyst in an alkyl halide having less than 4 carbon atoms per molecule to a concentration of approximately 1%, to saturation, cooling amylene to a temperature also below —10° C. and mixing about 1 part of the cooled catalyst solution with about 1 part to 4 parts of the cooled amylene, and allowing the polymerization reaction to continue for a substantial length of time, and thereafter quenching the polymerization reaction by the addition of an oxygenated liquid.

ROBERT M. THOMAS.
HAROLD C. REYNOLDS, Jr.